Sept. 22, 1931.   L. G. COPEMAN   1,824,535
APPARATUS FOR CONTROLLING THE TEMPERATURE OF UNIT CONTAINERS
Filed Feb. 8, 1926
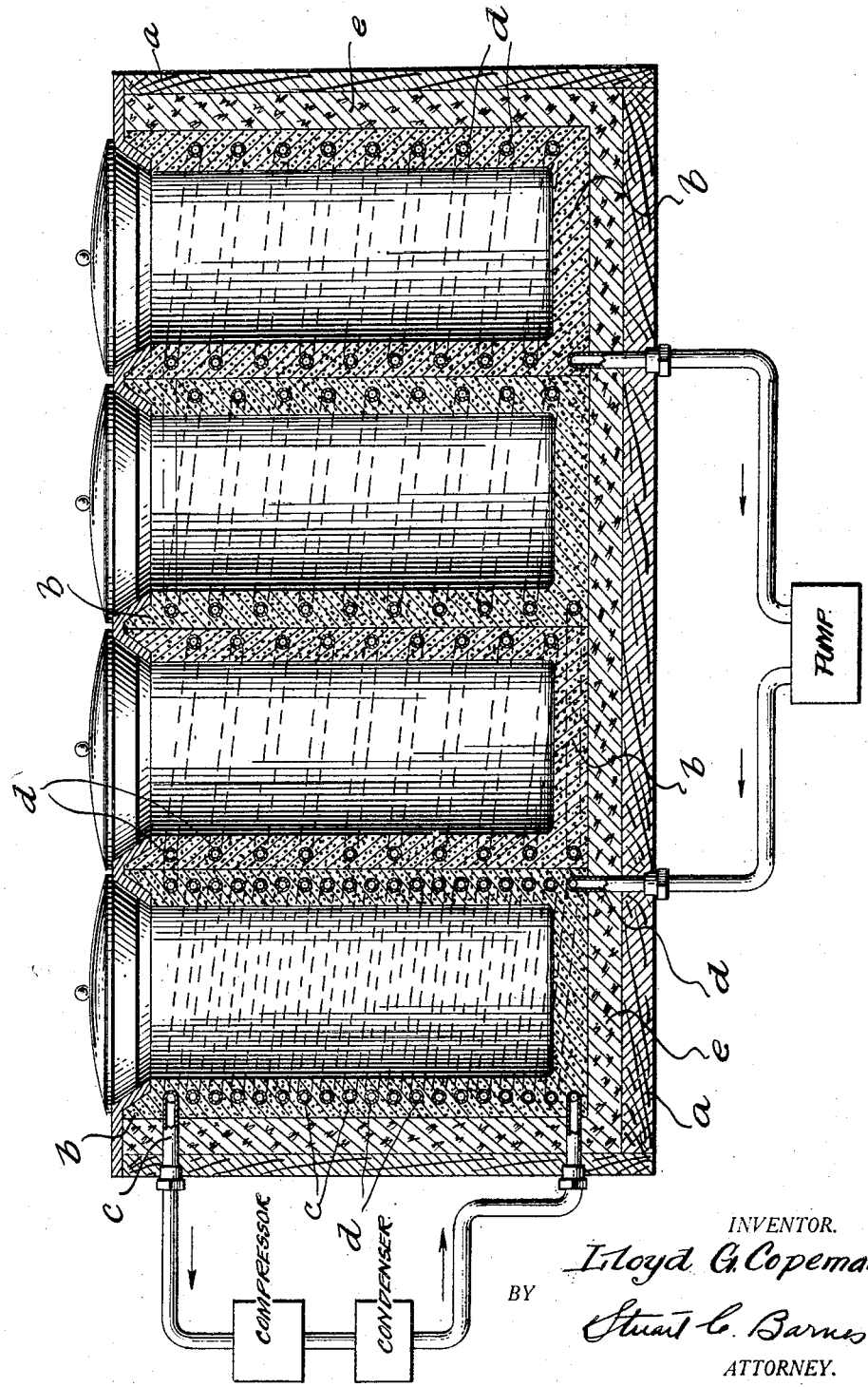
INVENTOR.
Lloyd G. Copeman.
BY
Stuart C. Barnes
ATTORNEY.

Patented Sept. 22, 1931

1,824,535

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

APPARATUS FOR CONTROLLING THE TEMPERATURE OF UNIT CONTAINERS

Application filed February 8, 1926. Serial No. 86,719.

This invention relates to a method and apparatus for controlling the temperature of unit containers in cabinet construction. It has to do particularly with those types of cabinets known as ice cream cabinets and contemplates a novel apparatus for receiving and cooling the ice cream containers, and a novel method for circulating the cooling medium through the different container units.

Heretofore in ice cream cabinets, or the like, utilizing mechanical refrigeration, it has been the practice to construct the container units, for receiving the ice cream cans, of a non-corrosive material such as copper, or the like. Between these container shells and the main wall of the cabinet there has heretofore been provided a relatively large space which has been filled with brine, or non-freezing solution. Suitable expansion coils are placed throughout the brine in such cabinets and connected to a suitable refrigerating machine whereby refrigerant may be circulated and expanded throughout said coils to effect cooling of the brine. This brine, in addition to its normal function of absorbing the heat from the container units, has been necessary to effect the stabilizing of temperature in cabinets of this type and is known in the art as a "hold over" medium. This method of cooling cabinets of this type has been objectionable, not only because of its low efficiency, but also because of the trouble caused by the brine seeping and eating through the joints of the container shells. Another great disadvantage of this type of cabinet is that it takes up a large amount of store space.

I have met and solved the problem of cabinet refrigeration in a different way. Instead of utilizing metallic container shells and surrounding said shells with the brine and refrigerating coils, I have discovered that by utilizing container units built of moulded stone and passing the refrigerating, or cooling medium, through coils imbedded in the stone that the brine tank, or brine chamber, may be done away with. Therefore, I preferably cast, or imbed, the cooling coils in the stone wall of the container units and utilize the wall itself as the heat absorbing and heat maintaining medium. In other words, the stone wall of the container unit itself takes the place of the free brine.

My cabinet involves a further efficient combination, in that in one container unit I imbed a plurality of expansion coils for receiving and circulating the refrigerant directly from the compressor unit, and alternately spaced between these direct expansion coils, I imbed a plurality of brine circulating coils. These brine circulating coils in the one container unit are connected to similar coils in adjacent units. By this arrangement I am able to considerably reduce the size of the refrigeration unit needed and, furthermore, in case of prolonged stoppage, the mass of refrigerated brine in the coils will be effective to maintain the effective temperature for a considerable time.

A further feature of my novel invention relates to a method of cooling a container unit by combined direct expansion and brine circulation and then utilizing this brine circulation to control the relative temperature of other container units in the cabinet whereby one or more containers may be utilized for receiving certain grades, or nature of substances and other units utilized to receive other grades, or kinds of substance which require a different degree of cooling.

In the drawing I have shown a vertical longitudinal section through a cabinet embodying the features of my invention and showing a manner of distributing the various coils through the walls of the container units.

In constructing a cabinet embodying my invention an outer shell $a$ of any suitable material may be utilized. The inner shells, or container units, may be designated $b$ and are formed of moulded stone. Such shells may be cast in suitable moulds and are preferably formed of an oxy-chloride cement. These shells, or container units $b$ are preferably of the same size so that an ice cream, or similar cabinet, of any capacity may be built by merely adding additional units.

The first container unit of my cabinet is preferably formed by casting, or imbedding two separate sets of coils in the walls of the container. One set of coils may be designated c and comprises direct expansion coils which may be connected directly to the compressor and condenser of any suitable refrigeration unit. Such a unit is diagrammatically illustrated in the drawing. The second set of coils may be designated d and are preferably cast, or imbedded, in the stone wall alternately between successive coils c. It will be understood that such coils c and d may be of any size and spaced as desired with reference to each other and with reference to the inner wall of the container unit, according to the degree of refrigeration required and the nature of the material to be cooled. The bottom coil of the coils d may be connected to any suitable pump, as diagrammatically illustrated in the drawing. These coils d are designed to contain a solution of brine and such brine is designed to be circulated through such coils by means of the pump. It will be obvious that the pump may be of a small size and will not take up much room.

The extra container units for the cabinet are as stated above preferably of moulded stone and of the same size and shape as the primary container unit. However, these extra container units, three of which are shown in the drawing, preferably have only the brine coils imbedded in the walls thereof. These brine coils are connected to the brine coils d of the primary container unit in any suitable manner and the coil in the last container unit is connected to a pipe leading to the circulating pump. It will be understood that these brine coils d imbedded in the walls of the additional container units may be of any size and any number desired.

The space between the stone container units and the outer wall a may be filled by any suitable insulation material e, such as cork. It will thus be seen that my ice cream, or similar cabinet, can be made much smaller than cabinets heretofore used where a brine chamber has been provided for surrounding the container shells. Although the moulded stone container units are substantially twice as heavy as the combined metallic shells and brine, by making my unit compact I have provided a cabinet which is substantially the same weight as cabinets having the brine chambers, and which cabinet at the same time takes up considerably less space than cabinets heretofore commercially used.

In operation the refrigerant will be circulated by the compressor and expanded in the coils c of the primary container unit and then returned to the compressor unit. The expansion of the refrigerant in these coils lowers the temperature, whereby heat will be abstracted from the stone wall and also from the brine in the brine coils. The cool stone walls and cool brine will not only tend to abstract the heat from the ice cream can, or other container, but will tend to maintain the temperature of such unit container substantially constant. A suitable thermostat connected with the refrigerating machine of the cabinet will, of course, tend to control the operation of the machine to maintain an even temperature, but the stone wall and the brine in the brine walls also materially help in maintaining this constant temperature. This cool brine, or non-freezing solution, cooled by the expansion coil in the primary container unit is then circulated through the brine coils in adjacent container units. In ice cream and other cabinets, it is usually the practice to have various grades of ice cream, or ices, or other materials which require a different degree of refrigeration, or cooling, especially when it is desired to serve the article to the public. That is, for instance, one grade of ice cream containing various foreign ingredients, must be kept cooler, for perfect serving, than other grades of ice cream. The same is true of various ices and soft drinks.

It would be obvious that by my novel arrangement of container units and method of cooling same, that the temperatures in the different unit containers may be maintained at a graded scale. Or if desired, they may be maintained at approximately the same temperature taken as a whole, or in groups.

What I claim is:

1. A refrigerating unit comprising a plurality of container units and a plurality of alternately positioned expansion coils and circulating coils for a non-freezing solution arranged in the walls of only one of said units said second named coils extending to and being arranged in at least one adjacent unit.

2. In a mechanical refrigerating system of the expansion type, the combination of a main cabinet having a plurality of refrigerating container units, one refrigerating unit being formed of stone walls, a series of direct expansion pipes and non-freezing solution circulating pipes positioned in heat conducting relation to the walls of only one of said units and a second of said refrigerating units adapted to be connected to the non-freezing solution circulating pipes of the first unit, and refrigerating mechanism for circulating a refrigerant for expansion in said direct expansion pipes to in turn lower the temperature of the non-freezing solution to effect cooling of the second refrigerating unit.

3. A refrigerating unit comprising a plurality of container units formed of stone walls, direct expansion pipes embedded in the walls of only one of said units, non-freezing solution circulating pipes also imbedded in the walls of said unit, non-freezing solution circulating pipes imbedded in the walls of an adjacent unit, means for connecting the said circulating pipes in said two units, a refrigerating unit for circulating a refrigerant through said direct expansion pipes and a pump for circulating the non-freezing solution through said non-freezing solution circulating pipes.

4. A refrigerating unit comprising a plurality of container units formed of stone walls, means for directly cooling only one of said units, a series of non-freezing solution circulating pipes positioned adjacent said direct cooling means and embedded in and extending around said other units and means for circulating non-freezing solution through said pipes.

5. A refrigerating cabinet formed of a plurality of independent molded stone container units, direct expansion conduits for circulating a refrigerant within the walls of only one of said units, a mass of non-freezing solution adapted to be circulated in heat conducting relation with a plurality of the molded stone container units and adapted to effect heat transfer through the stone, the said non-freezing solution being circulated in heat conducting relation to said direct expansion conduits, and the walls of said stone container units acting as a holdover medium to maintain the temperature of the containers within the cabinet.

In testimony whereof I affix my signature.

LLOYD G. COPEMAN.